United States Patent [19]
Geiger et al.

[11] Patent Number: 5,544,636
[45] Date of Patent: Aug. 13, 1996

[54] METHOD FOR OBTAINING TRIGGER SIGNALS TO REGULATE ENERGY CONVERSION IN THE COMBUSTION CHAMBER OF AN INTERNAL COMBUSTION ENGINE

[75] Inventors: Istvan Geiger; Winfried Oppermann, both of Braunschweig, Germany

[73] Assignee: Volkswagen AG, Wolfsburg, Germany

[21] Appl. No.: 351,676

[22] Filed: Dec. 8, 1994

[30]    Foreign Application Priority Data

Dec. 16, 1993 [DE] Germany ............... 43 42 985.8

[51] Int. Cl.⁶ ............... F02D 41/04; F02D 43/00; F02P 5/15; B60K 26/00
[52] U.S. Cl. ............... 123/478; 123/494
[58] Field of Search ............... 123/417, 435, 123/436, 478, 480, 492, 494, 446; 364/431.05

[56]    References Cited

U.S. PATENT DOCUMENTS

| | | | |
|---|---|---|---|
| 4,232,643 | 11/1980 | Leshner et al. | 123/436 |
| 4,471,743 | 9/1984 | Watanabe | 123/492 |
| 4,532,592 | 7/1985 | Citron et al. | 123/417 |
| 4,844,035 | 7/1989 | Takagi | 123/446 |
| 4,991,102 | 2/1991 | Sakamoto et al. | 123/480 |
| 5,127,384 | 7/1992 | Geringer | 123/494 |
| 5,331,933 | 7/1994 | Matsushita | 123/436 |
| 5,394,852 | 3/1995 | McAlister | 123/494 |

FOREIGN PATENT DOCUMENTS

| | | |
|---|---|---|
| 0113227 | 7/1984 | European Pat. Off. |
| 3802803 | 8/1988 | Germany . |
| 3821740 | 1/1990 | Germany . |

*Primary Examiner*—Willis R. Wolfe
*Attorney, Agent, or Firm*—Brumbaugh, Graves, Donohue & Raymond

[57]    ABSTRACT

Trigger signals are obtained from fuel injection parameters to regulate the energy conversion of an internal combustion engine which has individual injection valves for each of the combustion chambers. The fuel injection parameters are detected by sensors, from which fuel flow rate as a function of time, fuel injection time and other operating characteristics are determined and used to provide trigger signals for controlling fuel injection in a subsequent operation cycle. In this way, the influence of variations resulting from manufacturing tolerance and wear of components of the injection valves can be eliminated.

9 Claims, 3 Drawing Sheets

METHOD FOR OBTAINING TRIGGER SIGNALS TO REGULATE ENERGY CONVERSION IN THE COMBUSTION CHAMBER OF AN INTERNAL COMBUSTION ENGINE

BACKGROUND OF THE INVENTION

This invention relates to a method for obtaining trigger signals to regulate the energy conversion in the combustion chamber of an internal combustion engine.

Injection of fuel into a combustion chamber of an internal combustion engine is effected by providing individual injection valves for each combustion chamber which inject controlled quantities of fuel either directly into the combustion chamber itself or into an intake duct leading to the combustion chamber. Methods for regulating the energy conversion in each combustion chamber as a function of its share in the power output of the engine are disclosed, for example, in German Offenlegungsschrift No. 38 02 803, Published European Patent Application No. 113,227 and German Offenlegungsschrift No. 38 21 740. The share of the power output to be provided by each combustion chamber may be determined in various ways, for example, by determining engine roughness, measuring engine torque reactions, evaluating sound conducted from the engine by an acoustic sensor, measuring the exhaust temperature, measuring the injection pressure by a pressure sensor, or measuring the progress of combustion by an ionic flux sensor in each combustion chamber.

Regardless of whether signals for fuel injection and for regulation of energy conversion are obtained individually for each combustion chamber or whether signals are obtained which apply to all combustion chambers, the acquisition of the fuel injection signals and the trigger signals to regulate energy conversion and the regulation to particular injection and ignition times are independent of each other.

It has been found, however, that, in modern engine design, especially in internal combustion engines for motor vehicles, the difference between the commencement of injection and the triggering of ignition measured in units of time or in crankshaft angle, and the proportioning of fuel as a function of engine speed, are often more important than a definite coordination with the top dead center position of the piston or a specific crankshaft angle.

The problem of regulating energy conversion is aggravated by the fact that dimensional variations resulting from production tolerances or wear, especially with respect to the injection valve, may produce operational variations which are disadvantageous with respect to precision of the combustion timing. In mass production, as is well known, extensive testing operations involving a substantial expense are carried out on injection valves in order to achieve low dimensional variations.

SUMMARY OF THE INVENTION

Accordingly, it is an object of the present invention to provide a method for obtaining trigger signals to regulate energy conversion in an internal combustion engine which overcomes the disadvantages of the prior art.

Another object of the invention is to provide an energy conversion trigger signal determination method that will permit optimal adjustment of ignition times, and preferably also of fuel injection times, as well as fuel allocation, at a low cost.

These and other objects of the invention are attained by providing a method in which fuel injection parameters are detected by sensors and used to provide energy conversion trigger signals for controlling fuel injection or ignition. In one embodiment, the fuel injection flow rate as a function of time $m_e(t)$ and the fuel injection time $t_m$ are determined and trigger signals are generated in accordance with the detected values.

According to the invention, therefore, trigger signals for regulating energy conversion in a combustion chamber of an internal combustion engine are obtained from signals derived from the actual fuel injection process and, according to one embodiment, the quantity of fuel injected over time, $m_e(t)$, is used as one injection parameter. This makes it possible to take account of dimensional variations in the relevant components, in particular, the injection valves, due to manufacturing tolerances and wear in adjusting the commencement of injection, the time or crankshaft angle difference between commencement of injection and triggering of ignition or fuel injection to control the injected quantity of fuel as a function of time. This applies also to the case in which the specific time of commencement of injection and/or the quantity of injection over time is optimized in view of the instantaneous operating parameters of the engine. Even in this case, however, the measured injection parameters used to determine the energy conversion trigger signals may be optimized as functions of mechanical and/or environmental parameters in accordance with previously stored information, and thus they may deviate from the detected parameters for optimizing the commencement of injection.

The method of the invention is especially effective if the fuel injection parameters of the preceding injection cycle are detected individually for each combustion chamber by sensors arranged to detect the motion parameters of servo elements of the injection valve and the injection pressure when fuel is supplied to the combustion chamber. According to one embodiment of the invention using conventional fuel injection valves, sensors are provided for detecting motion of needle-valve servo elements of the injection valves. To determine the injection pressure, pressure sensors may be employed in the fuel lines leading to the injection valves.

In principle, the method may be carried out so that a measurement of the injection parameters occurs only at selected times, and the readings so obtained are stored. The stored readings then constitute the data for regulating the energy conversion, for example, for determining ignition trigger signals, until the next measurement of the injection parameters. Alternatively, however, and particularly when regulation of the commencement of injection is provided, it is possible to dispense with separate acquisition and/or regulation for each of the combustion chambers and thus to obtain trigger signals for all of the ignition elements of the engine, using the injection parameters only for that cylinder which requires the greatest tolerance-related shift in ignition time to avoid a misfire as the basis for all of the trigger signals.

Another advantage of the invention is that conventional measuring and regulating arrangements may be employed while making use of the signals for the injection parameters in a manner different from the prior art to acquire trigger signals.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENT

Figure 1A:
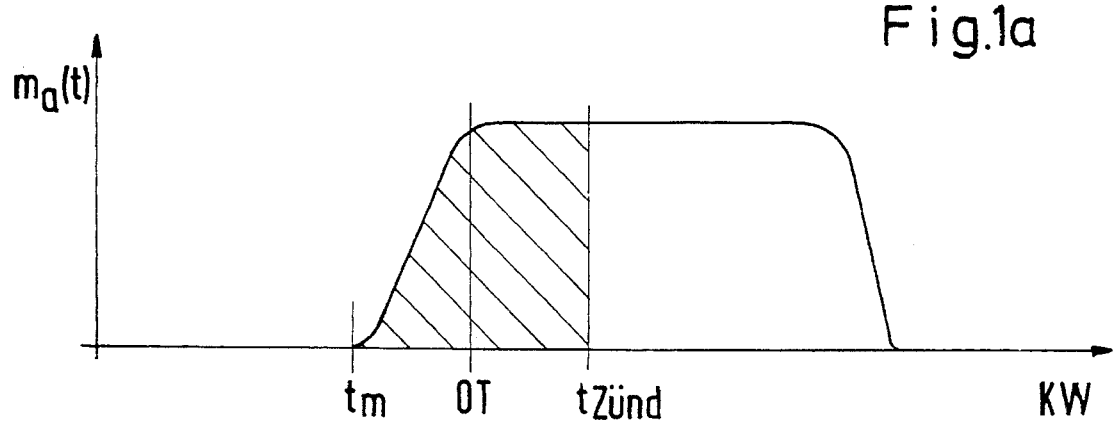
FIG. 1a is a graphical representation showing fuel injection flow rate as a function of crankshaft angle.
Figure 1B:
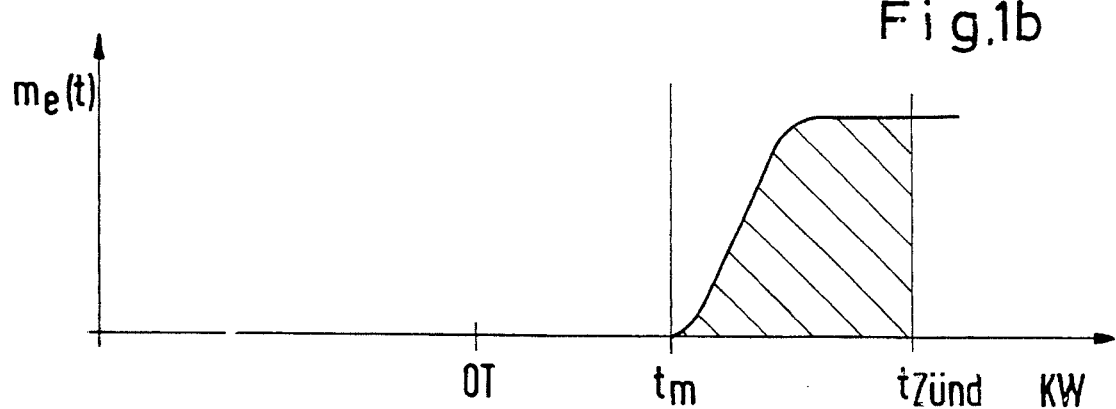
FIG. 1b is a graphical representation similar to that of FIG. 1a showing fuel injection flow rate as affected by dimensional variations due to tolerances.
Figure 2A:
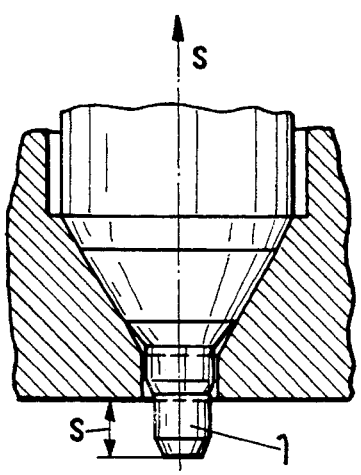
FIG. 2a is a fragmentary sectional view showing the construction of a fuel injection valve in the closed position.
Figure 2B:
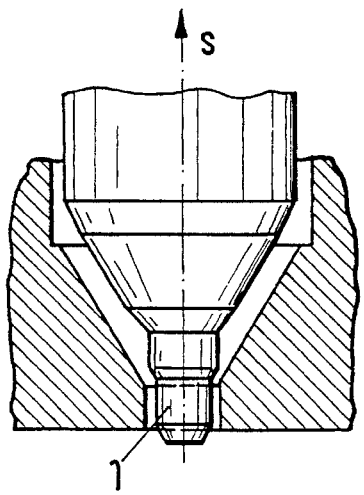
FIG. 2b is a view showing the fuel injection valve of FIG. 2a in the open position.

In the typical arrangement illustrated in the drawings, the open area of a fuel injection valve may advantageously be determined as a function of time using the parameters of motion of servo elements of the injection valve. One possible configuration of an injection valve with a servo element 1 in the form of a valve needle is shown in FIGS. 2a and 2b, in which a measure of the open area of the injection valve is obtained by detecting the travel S of the valve needle 1.

Figure 3A:
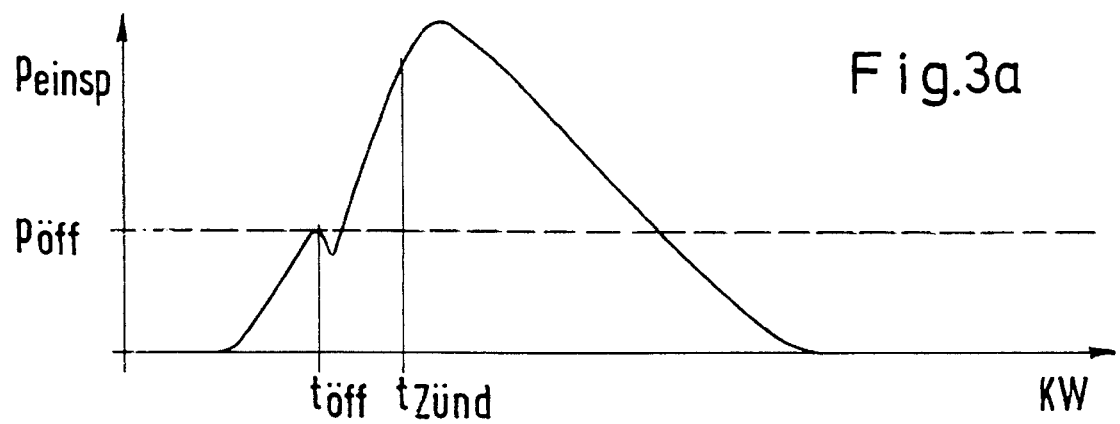
FIG. 3a is an idealized graphical representation showing fuel injection pressure as a function of crankshaft angle.
Figure 3B:
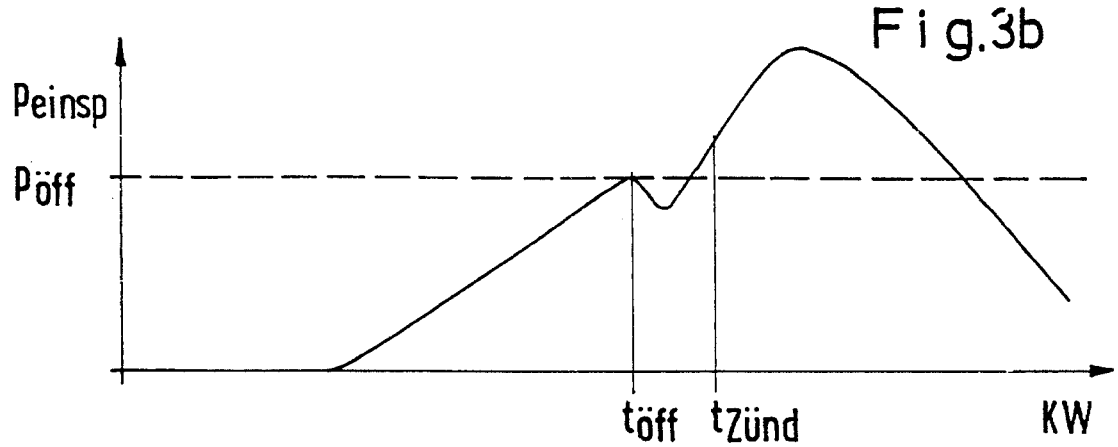
FIG. 3b is an idealized graphical representation similar to FIG. 3a showing fuel injection pressure as affected by dimensional variations due to tolerances.

As previously mentioned, the behavior of the fuel flow rate as a function of time $m_e(t)$ as fuel is injected into the combustion chamber 2 also depends on the pressure $P_{einsp}$ at which the fuel is injected. A corresponding curve for the injection pressure $P_{einsp}$ as a function of time without the influence of variations due to manufacturing tolerances or wear is shown in FIG. 3a, where attainment of the opening pressure $p_ö$ffindicates the commencement of injection. The ignition time $t_{zünd}$ which may be preassigned as a function of mechanical and/or environmental parameters is also indicated. Because of dimensional variations due to manufacturing tolerances in the injection valve, a variation occurs in the time $t_m$ at which the injection pressure $P_{einsp}$ is sufficient to open the injection valve, and the magnitude of the pressure also varies because altered pressure conditions prevail in the combustion chamber when the injection time $t_m$ is varied, as shown in FIG. 3b. Accordingly, the time of ignition $t_{zünd}$ must be correspondingly shifted, as also shown in FIG. 3b.

Figure 4:
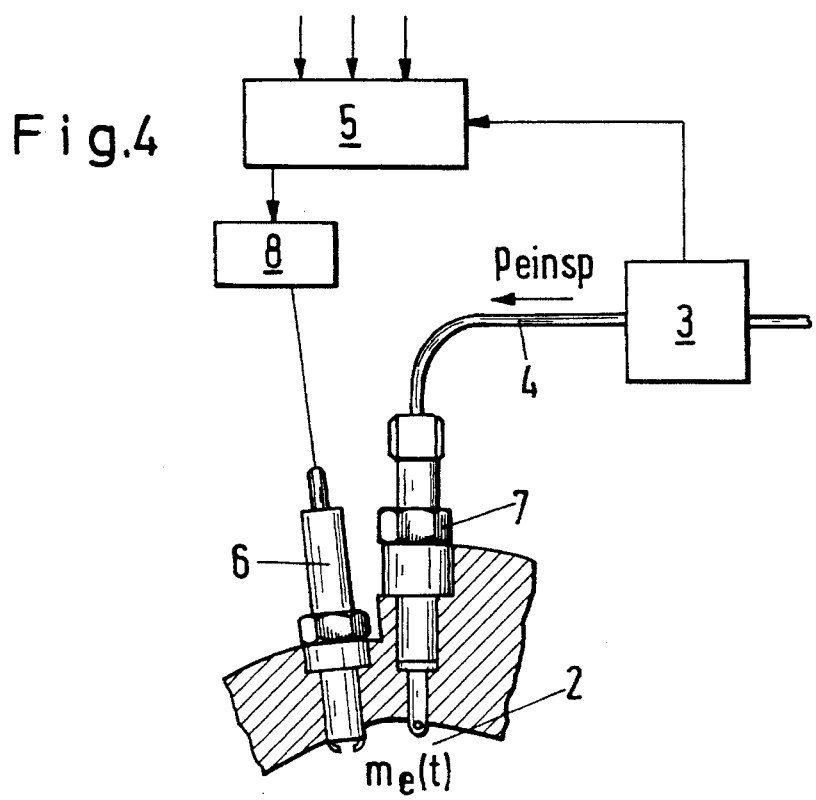
FIG. 4 is a schematic diagram showing a representative arrangement for obtaining trigger signals to regulate energy conversion in a combustion chamber in accordance with the invention.

As shown in FIG. 4, the magnitude of the fuel injection pressure may advantageously be detected by a pressure sensor 3 disposed in a fuel line 4 leading to the fuel injection valves. A pressure signal is supplied from the sensor 3 to a control unit 5, as are signals representing the open area of an injection valve 7 and other parameters, such as load, speed, engine and ambient temperature, and combustion chamber and ambient pressure. These parameter signals may be used directly by the control unit or they may be stored in a control unit memory for subsequent use, for example, in a succeeding combustion cycle. Using these parameter signals, the control unit 5 may, for example, generate energy conversion trigger signals to control the commencement of fuel injection or the fuel flow rate over time to a selected target value. From these signals, the control unit 5 determines the optimum ignition time $t_{zünd}$ of an ignition control 8 for a corresponding spark plug 6.

Figure 5:
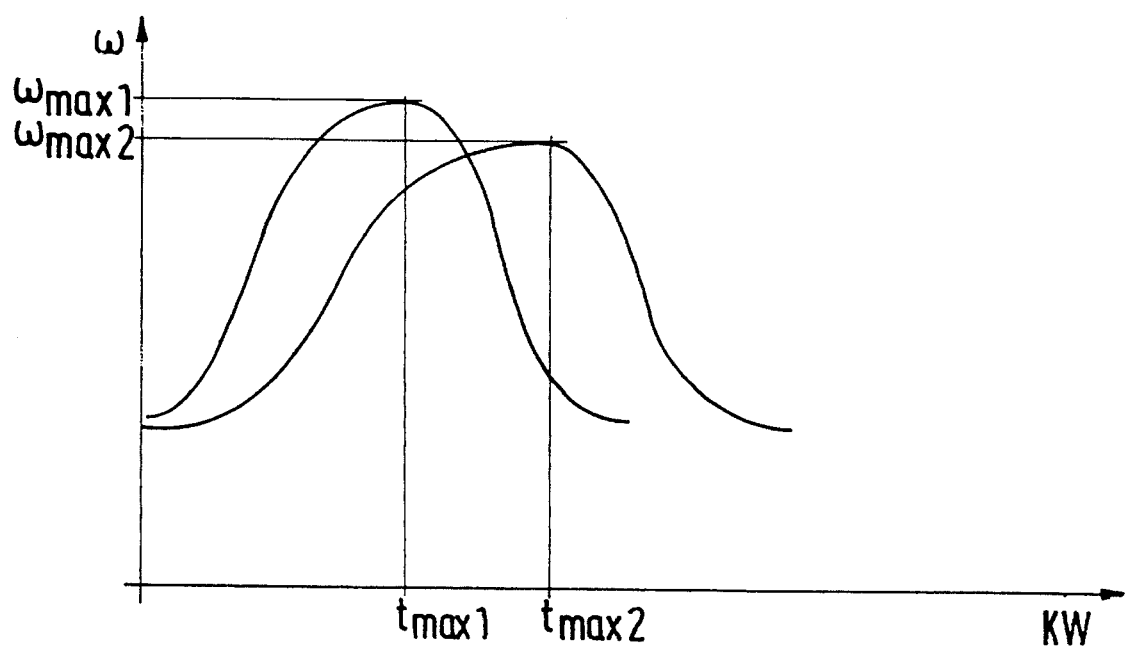
FIG. 5 is a graphical representation showing differences in the magnitude and crankshaft angle of the angular velocity maxima for two combustion cycles.

The fuel flow rate determined during an injection cycle may also be employed to regulate engine smoothness. Each combustion produces a maximum in the angular velocity of the crankshaft. Because of variations resulting from parts tolerances among the injection valves of the several cylinders as well as changes due to wear in each injection valve, differences occur between maxima of crankshaft angular velocity, both in value $\omega_{max}$ and in time $t_{max}$, resulting in engine roughness. FIG. 5 shows both a time shift $(t_{max2}-t_{max1})$ and an amplitude difference $(\omega_{max1}-\omega_{max2})$ between the angular velocity maxima for two combustion cycles for any given cylinder in terms of the crankshaft angle KW. By detecting the individual injection parameters, i.e., the commencement of injection $t_m$ and injection flow rate over time $m_e(t)$, and using these parameters in the control circuit 5, the required energy conversion trigger signals for all cylinders over a conventional speed and load diagram can be calculated individually in a conventional manner for each cylinder separately for the succeeding combustion cycle. Consequently, the angular velocity fluctuations producing roughness can be evened out by shifting the time of injection or varying the injection flow rate.

Although the invention has been described herein with reference to a specific embodiment, many modifications and variations therein will readily occur to those skilled in the art. Accordingly, all such variations and modifications are included within the intended scope of the invention.

We claim:

1. A method for obtaining trigger signals to regulate the energy conversion of an internal combustion engine having an individual fuel injection valve for each of the engine combustion chambers comprising determining fuel injection parameters by detection of fuel injection characteristics with sensors and generating energy conversion trigger signals using those parameters, wherein the fuel injection flow rate ($m_e(t)$) with respect to time and the commencement of fuel injection ($t_m$) are detected as fuel injection parameters.

2. A method according to claim 1 wherein motion parameters of servo elements of the injection valves are detected by sensors.

3. A method according to claim 2 wherein the sensors include motion sensors for detecting travel of valve needles of the injection valves.

4. A method according to claim 1 including detecting the fuel injection pressure ($P_{einsp}$) by a sensor as one fuel injection characteristic.

5. A method according to claim 1 wherein the fuel injection parameters determined to generate the trigger signals are varied as functions of mechanical and/or environmental parameters, including one or more of load, speed, engine and ambient temperature, combustion chamber pressure and ambient pressure.

6. A method according to claim 1 wherein the energy conversion trigger signals are generated from fuel injection parameters determined for each combustion chamber.

7. A method according to claim 1 wherein the energy conversion trigger signals are generated directly from the fuel injection parameters.

8. A method according to claim 1 wherein the fuel injection parameters are stored and energy conversion trigger signals are generated from the stored parameters.

9. A method according to claim 1 wherein the fuel injection parameters are used to generate trigger signals which control the commencement of fuel injection to a selected target value.

* * * * *